US008891946B2

(12) United States Patent
Chen et al.

(10) Patent No.: US 8,891,946 B2
(45) Date of Patent: Nov. 18, 2014

(54) ACCELERATED PLAYBACK OF STREAMING MEDIA (75) Inventors: Eli Chen, San Mateo, CA (US); Greg Peters, San Francisco, CA (US)

(73) Assignee: Netflix, Inc., Los Gatos, CA (US)

( * ) Notice: Subject to any disclaimer, the term of this patent is extended or adjusted under 35 U.S.C. 154(b) by 685 days.

(21) Appl. No.: 12/556,372

(22) Filed: Sep. 9, 2009

(65) Prior Publication Data

US 2011/0268428 A1    Nov. 3, 2011

(51) Int. Cl.
*H04N 5/783* (2006.01)
*H04L 29/06* (2006.01)

(52) U.S. Cl.
CPC ............ *H04L 65/4092* (2013.01); *H04L 65/80* (2013.01)
USPC .......................................................... 386/345

(58) Field of Classification Search
CPC ............. H04N 5/91; H04N 7/00; H04N 7/24; H04N 7/50; H04N 7/173; H04N 11/02
USPC ......................................... 386/343, 345, 347
See application file for complete search history.

(56) References Cited

U.S. PATENT DOCUMENTS

| | | | | |
|---|---|---|---|---|
| 7,536,469 B2 * | 5/2009 | Chou et al. | ..................... | 709/231 |
| 7,925,770 B1 * | 4/2011 | Hamel et al. | .................. | 709/231 |
| 2004/0098748 A1 * | 5/2004 | Bo et al. | ........................ | 725/105 |
| 2008/0131075 A1 | 6/2008 | Pontual et al. | | |
| 2008/0205856 A1 | 8/2008 | Kim et al. | | |
| 2008/0235741 A1 * | 9/2008 | Ljolje et al. | ..................... | 725/89 |
| 2009/0204842 A1 | 8/2009 | Tetik et al. | | |
| 2009/0297123 A1 * | 12/2009 | Virdi et al. | ..................... | 386/69 |
| 2010/0080290 A1 * | 4/2010 | Mehrotra | ................. | 375/240.07 |
| 2010/0161761 A1 * | 6/2010 | Yu et al. | ........................ | 709/219 |

OTHER PUBLICATIONS

PS3 News, "Zune Video on Xbox Live Could Finish Blu-ray for HD Streaming," Jul. 24, 2009, available at http://www.ps3news.com/XBox-360/zune-video-on-xbox-live-could-finish-blu-ray-for-hd-streaming/.
Microsoft IIS, "Smooth Streaming," Jul. 2009, available at http://www.iis.net/extensions/SmoothStreaming.
Patel, Nilay, "Xbox Live Gets 1080p Zune Video Store, Netflix Browsing, Twitter and Facebook Integration," Engadget HD, Jun. 1, 2009, available at htto://www.engadgethd.com/2009/06/01/xbox-live-gets-live-tv-streaming-netflix-browsing/.
International Search Report. PCT/US10/48261 dated Oct. 22, 2010.

* cited by examiner

*Primary Examiner* — Thai Tran
*Assistant Examiner* — William Tran
(74) *Attorney, Agent, or Firm* — Patterson + Sheridan, LLP (57) ABSTRACT One embodiment of the present invention provides a technique for dynamically adjusting streaming media bit rates in response to user requests for accelerated playback. When user may selects to accelerate playback of streaming media content, a content player may begin decoding data from a content buffer at the accelerated rate. At the same time, the content player may estimate a bit rate that can be supported by both the accelerated playback rate and prevailing network bandwidth and latency. That is, a bit rate at which the accelerated playback may be continued without resulting in an eventual buffer under-run.

15 Claims, 10 Drawing Sheets

ACCELERATED PLAYBACK OF STREAMING MEDIA

BACKGROUND OF THE INVENTION

1. Field of the Invention

Embodiments of the present invention generally relate to digital media and, more specifically, to dynamically adjusting streaming media bit rates in response user requests for accelerated playback.

2. Description of the Related Art

Digital content distribution systems typically include a content server, a content player, and a communications network connecting the content server to the content player. The content server is configured to store digital content files available for download from the content server to the content player. Each digital content file corresponds to a specific identifying title, such as "Gone with the Wind," which is familiar to a user. The digital content file typically includes sequential content data, organized according to playback chronology, including audio data and/or video data.

The content player is configured to download and play a digital content file, in response to a user request. The process of playing the digital content file includes decoding and rendering audio and video data to generate audio and video signals sent to audio speakers and a display screen. Playback typically involves a technique known as "streaming," where the content server transmits digital content to the content player, which plays the digital content file while content data is being received. To account for variable latency and bandwidth within the communications network, a content buffer queues the incoming content data ahead of the content data actually being played. During moments of network congestion, which leads to lower available bandwidth, less content data is added to the content buffer, which may drain down as content data is being de-queued to support playback at a certain playback bit rate. However, during moments of high network bandwidth, the content buffer is replenished and additional buffer time is added until the content buffer is generally full again. In practical systems, the content buffer may queue content data corresponding to a time span ranging from seconds to more than a minute.

Each digital content file stored on the content server is typically encoded for a specific playback bit rate. Each title may be encoded using a variety of different bit rates. Prior to initiating playback, the content player may measure available bandwidth from the content server and select a digital content file having a bit rate that can be supported by the measured available bandwidth. To maximize playback quality, the content player may select to stream the digital content file with the highest bit rate that does not exceed the measured bandwidth. To the extent the communications network can provide adequate bandwidth to download the selected digital content file while satisfying bit rate requirements, playback proceeds satisfactorily. This approach presumes that the video data is played back at a normal bit rate. In some cases, however, a user may desire to accelerate playback, e.g., to skip through selected portions of the content file more quickly than normal. Doing so drains data from the content buffer at a greater rate than playback at a normal speed. Thus, in practice, if a user selects to accelerate playback for an extended period, the content buffer may drain completely, resulting in a condition known as a buffer under-run. If a buffer under-run occurs, playback may become highly unreliable or simply halt until additional content can be retrieved and playback restarted, severely diminishing overall playback quality.

As the foregoing illustrates, there remains a need for a technique for downloading digital content files to a content player that provides a higher quality playback experience than prior art approaches, including techniques that allow for accelerated playback of streaming media.

SUMMARY OF THE INVENTION

One embodiment of the present invention sets forth a method for dynamically adjusting a bit rate used to encode units of digital content downloaded from a content server to a content player. The method includes receiving a request to modify a playback rate at which the units of digital content of the file are played back on the content player from a from a first playback rate to a second playback rate. The units of digital content are stored in a buffer on the content player prior to playback. The method may also include decoding the units of digital content stored in the content buffer, rendering a display of the units of digital content on an output display device at the second playback rate, and determining a bit rate for a next unit of digital content to be requested from the content server. The method may also include downloading the next unit of digital content from the content server to the content buffer for playback. Further, the next unit of digital content is encoded at the determined bit rate.

For example, a user may select to accelerate playback of streaming media content. In such a case, the content player begins decoding and rendering an audiovisual stream from the content buffer at the accelerated rate. The content player then estimates a bit rate that can be supported by both the accelerated playback rate and prevailing network bandwidth and latency. That is, the content player may identify the best available bit rate at which the accelerated playback may be continued without resulting in an eventual buffer under-run. Thus, advantageously, users may move quickly through selected portions of streaming video content while still following the events depicted in a streaming audiovisual presentation.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention may be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide an improved playback experience for media content streamed over a communications network to a playback device. More specifically, embodiments of the invention provide for dynamically adjusting streaming media bit rates in response to user requests for accelerated playback. In one embodiment, a user may select to accelerate playback of streaming media content (e.g., to a rate of 1.5× or 2.0× a normal (1.0) playback rate). In response, a content player begins decoding and playing back data from a content buffer at the accelerated rate. Further, the content player may pitch correct an audio stream to compensate for the accelerated playback rate.

At the same time, the content player may estimate a bit rate that can be supported by both the accelerated playback rate and prevailing network bandwidth and latency. That is, a bit rate at which the accelerated playback may be continued without resulting in an eventual buffer under-run. In one embodiment, the content player may play back higher bit rate data already in the buffer and begin requesting and buffering data at the lower bit rate which supports the accelerated playback. Once the higher bit-rate content is exhausted from the buffer, the content player may seamlessly switch to playing back content at the lower bit rate. Thus, duplicate content is not streamed to the content player. At the same time, the content may be played back at the accelerated rate without resulting in a buffer under-run.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
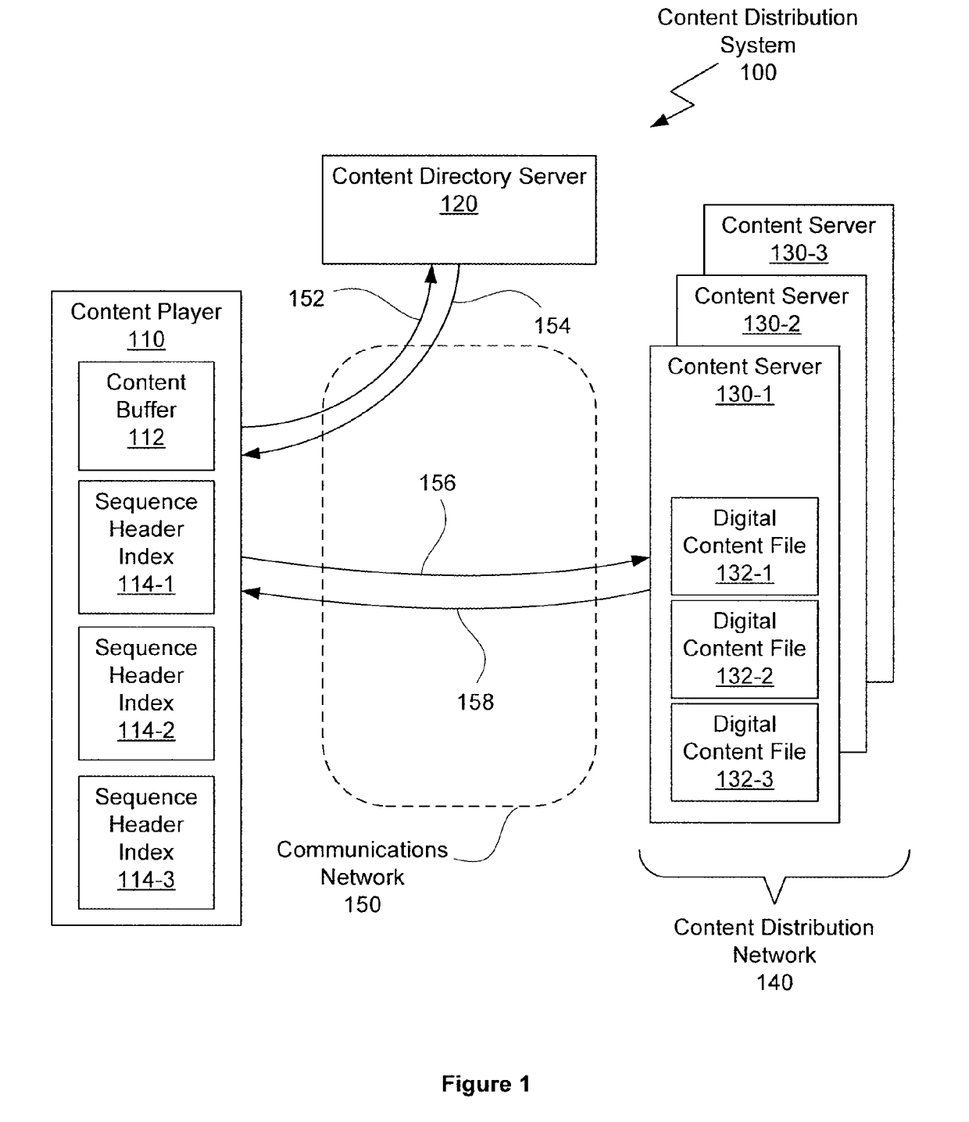
FIG. 1 illustrates a content distribution system configured to implement aspects of the present invention.

FIG. 1 illustrates a content distribution system 100 configured to implement one or more aspects of the present invention. As shown, the content distribution system 100 includes, without limitation, a content player 110, one or more content servers 130, and a communications network 150. The content distribution system 100 may also include a content directory server 120. In one embodiment, the one or more content servers 130 comprise a content distribution network (CDN) 140.

The communications network 150 includes a plurality of network communications systems, such as routers and switches, configured to facilitate data communication between the content player 110 and the one or more content servers 130. Persons skilled in the art will recognize that many technically feasible techniques exist for building the communications network 150, including technologies practiced in deploying the well-known internet communications network.

The content directory server 120 comprises a computer system configured to receive a title lookup request 152 and generate file location data 154. The title lookup request 152 includes, without limitation, a name of a movie or song requested by a user. The content directory server 120 queries a database (not shown) that maps a video stream of a given title encoded at a particular playback bit rate to a digital content file 132, residing within an associated content server 130. The file location data 154 includes, without limitation, a reference to a content server 130 that is configured to provide the digital content file 132 to the content player 110.

The content server 130 is a computer system configured to serve download requests for digital content files 132 from the content player 110. The digital content files may reside on a mass storage system accessible to the computer system. The mass storage system may include, without limitation, direct attached storage, network attached file storage, or network attached block-level storage. The digital content files 132 may be formatted and stored on the mass storage system using any technically feasible technique. A data transfer protocol, such as the well-known hyper-text transfer protocol (HTTP), may be used to download digital content files 132 from the content server 130 to the content player 110.

Each title (a movie, song, or other form of digital media) is associated with one or more digital content files 132. Each digital content file 132 comprises, without limitation, a sequence header index 114, audio data and an encoded sequence. An encoded sequence comprises a complete version of the video data corresponding title encoded to a particular playback bit rate. For example, a given title may be associated with digital content file 132-1, digital content file 132-2 and digital content file 132-3. Digital content file 132-1 may comprise sequence header index 114-1 and an encoded sequence encoded to an average playback bit rate of approximately 250 kilobits per second (Kbps). Digital content file 132-2 may comprise sequence header index 114-2 and an encoded sequence encoded to an average playback bit rate of approximately 1000 Kbps. Similarly, digital content file 132-3 may comprise sequence header index 114-3 and an encoded sequence encoded to an average playback bit rate of approximately 1500 Kbps. The 1500 Kbps encoded sequence enables higher quality playback and is therefore more desirable for playback versus the 250 Kbps encoded sequence.

An encoded sequence within a digital content file 132 is organized as units of video data representing a fixed span of playback time. Overall playback time is organized into sequential time slots, each corresponding to one fixed span of playback time. For a given time slot, one unit of video data is represented within the digital content file 132 for the playback bit rate associated with the digital content file 132. Because variable bit rate encoding may be used, each unit of video data may be variable in size, despite a direct correspondence to the fixed span of playback time. For the above example, each time slot within the digital content file 132-1 may include a unit of video data encoded at 1500 Kbps. In one embodiment, units of audio data are encoded at a fixed bit rate for each time slot and stored in the digital content file 132.

The units of video data and units of audio data are configured to provide time-synchronized playback, beginning at the start of each time slot. To avoid starving either audio playback or video playback, units of audio data and units of video data are downloaded in a generally alternating pattern to assure that the audio buffer 244 and video buffer 246 store comparable durations of playback time each.

Persons skilled in the art will readily recognize that each encoded sequence, as defined above, comprises a digital content "stream." Furthermore, the process of downloading a particular encoded sequence from the content server 130 to the content player 110 comprises "streaming" the digital content to the content player 110 for playback at a particular playback bit rate.

The content player 110 may comprise a computer system, a set top box, a mobile device such as a mobile phone, or any other technically feasible computing platform that has network connectivity and is coupled to a display device and a speaker system. As described in greater detail below, the content player 110 is configured to download units of video data for a selected bit rate as well as adapt the selected bit rate for subsequently downloaded units of video requests to accelerate the playback of the streaming media content. Additionally, as available bandwidth within the communications network 150 fluctuates the content player may adjust a requested bit rate encoding for units of video data that have not yet been downloaded.

Although, in the above description, the content distribution system 100 is shown with one content player 110 and one CDN 140, persons skilled in the art will recognize that the architecture of FIG. 1 contemplates only an exemplary embodiment of the invention. Other embodiments, may include any number of content players 110 and/or CDNs 140. Thus, FIG. 1 is in no way intended to limit the scope of the present invention in any way.

Figure 2:
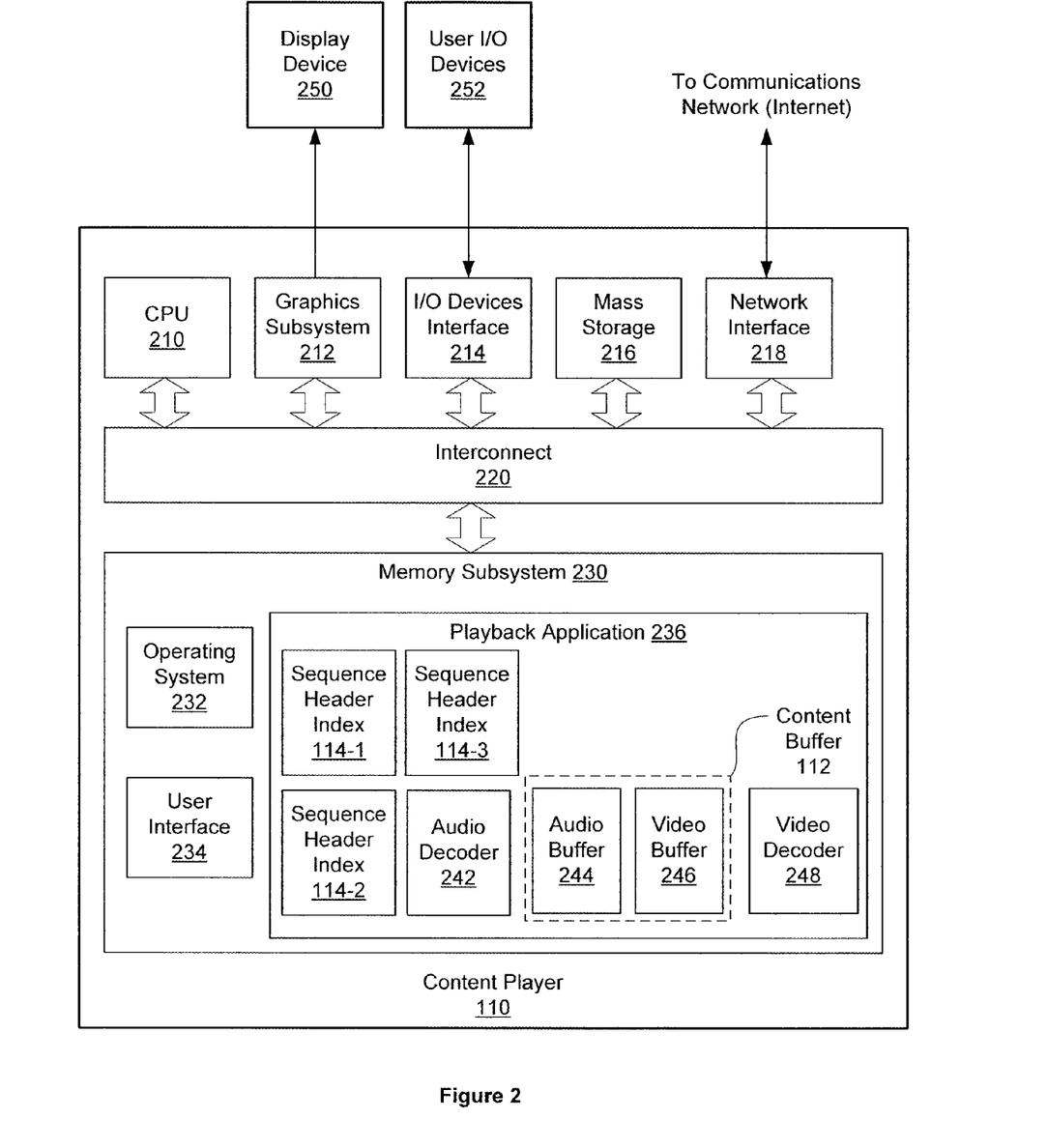
FIG. 2 further illustrates the content player of FIG. 1, according to one embodiment of the invention.

FIG. 2 further illustrates the content player 110 of FIG. 1, according to one embodiment of the invention. As shown, the content player 110 includes, without limitation, a central processing unit (CPU) 210, a graphics subsystem 212, an input/output (I/O) device interface 214, a network interface 218, an interconnect 220, and a memory subsystem 230. The content player 110 may also include a mass storage unit 216.

The CPU 210 is configured to retrieve and execute programming instructions stored in the memory subsystem 230. Similarly, the CPU 210 is configured to store and retrieve application data residing in the memory subsystem 230. The interconnect 220 is configured to facilitate transmission of data, such as programming instructions and application data, between the CPU 210, graphics subsystem 212, I/O devices interface 214, mass storage 216, network interface 218, and memory subsystem 230.

The graphics subsystem 212 is configured to generate frames of video data and transmit the frames of video data to display device 250. In one embodiment, the graphics subsystem 212 may be integrated into an integrated circuit, along with the CPU 210. The display device 250 may comprise any technically feasible means for generating an image for display. For example, the display device 250 may be fabricated using liquid crystal display (LCD) technology, cathode-ray technology, and light-emitting diode (LED) display technology (either organic or inorganic). An input/output (I/O) device interface 214 is configured to receive input data from user I/O devices 252 and transmit the input data to the CPU 210 via the interconnect 220. For example, user I/O devices 252 may comprise one of more buttons, a keyboard, and a mouse or other pointing device. The I/O device interface 214 also includes an audio output unit configured to generate an electrical audio output signal. User I/O devices 252 includes a speaker configured to generate an acoustic output in response to the electrical audio output signal. In alternative embodiments, the display device 250 may include the speaker. A television is an example of a device known in the art that can display video frames and generate an acoustic output. A mass storage unit 216, such as a hard disk drive or flash memory storage drive, is configured to store non-volatile data. A network interface 218 is configured to transmit and receive packets of data via the communications network 150. In one embodiment, the network interface 218 is configured to communicate using the well-known Ethernet standard. The network interface 218 is coupled to the CPU 210 via the interconnect 220.

The memory subsystem 230 includes programming instructions and data that comprise an operating system 232, user interface 234, and playback application 236. The operating system 232 performs system management functions such as managing hardware devices including the network interface 218, mass storage unit 216, I/O device interface 214, and graphics subsystem 212. The operating system 232 also provides process and memory management models for the user interface 234 and the playback application 236. The user interface 234 provides a specific structure, such as a window and object metaphor, for user interaction with content player 110. Persons skilled in the art will recognize the various operating systems and user interfaces that are well-known in the art and suitable for incorporation into the content player 110.

The playback application 236 is configured to retrieve a digital content file 132 from a content server 130 via the network interface 218 and play the digital content file 132 through the graphics subsystem 212. The graphics subsystem 212 is configured to transmit a rendered video signal to the display device 250. In normal operation, the playback application 236 receives a request from a user to play a specific title. The playback application 236 then locates the digital content files 132 associated with the requested title, where each digital content file 132 associated with the requested title includes an encoded sequence encoded to a different playback bit rate. In one embodiment, the playback application 236 locates the digital content files 132 by posting title lookup request 152 to the content directory server 120. The content directory server 120 replies to the title lookup request 152 with file location data 154 for each digital content file 132 associated with the requested title. Each file location data 154 includes a reference to the associated content server 130, in which the requested digital content file 132 resides. The title lookup request 152 may include the name of the requested title, or other identifying information with respect to the title. After the playback application 236 has located the digital content files 132 associated with the requested title, the playback application 236 downloads sequence header indices 114 associated with each digital content file 132 associated with the requested title from the content server 130. A sequence header index 114 associated with digital content file 132, described in greater detail in FIG. 4A, includes information related to the encoded sequence included in the digital content file 132.

The requested digital content file 132-1 is downloaded into the content buffer 112, configured to server as a first-in, first-out queue. In one embodiment, each unit of downloaded data comprises a unit of video data or a unit of audio data. As units of video data associated with the requested digital content file 132-1 are downloaded to the content player 110, the units of video data are pushed into the content buffer 112. Similarly, as units of audio data associated with the requested digital content file 132-1 are downloaded to the content player 110, the units of audio data are pushed into the content buffer 112. In one embodiment the units of video data are stored in video buffer 246 within the content buffer 112, and units of audio data are stored in audio buffer 224, also within the content buffer 112.

A video decoder 248 reads units of video data from the video buffer 246, and renders the units of video data into a sequence of video frames corresponding in duration to the fixed span of playback time. Reading a unit of video data from the video buffer 246 effectively de-queues the unit of video data from the video buffer 246 (and from the content buffer 112). The sequence of video frames is processed by graphics subsystem 212 and transmitted to the display device 250.

An audio decoder 242 reads units of audio data from the audio buffer 244, and renders the units of audio data into a sequence of audio samples, generally synchronized in time with the sequence of video frames. In one embodiment, the sequence of audio samples is transmitted to the I/O device interface 214, which converts the sequence of audio samples into the electrical audio signal. The electrical audio signal is transmitted to the speaker within the user I/O devices 252, which, in response, generates audio output.

When playback is initiated, the playback application 236 may request units of video data encoded to the lowest available bit rate, thereby minimizing start time perceived by a user. However, as bandwidth conditions within the communications network 150 allow, the playback application 236 may request units of video data encoded to higher bit rates, thereby improving playback quality over time, without introducing a startup delay commensurate with the highest level of playback quality ultimately achieved by the playback application 236. Alternatively, the playback application 236 may sample the prevailing bandwidth conditions prior to requesting any units of video data and select the highest bit rate which may be supported. If bandwidth conditions within the communications network 150 deteriorate during playback, then the playback application 236 may request subsequent units of video data encoded to a lower bit rate. In one embodiment, the playback application 236 determines which bit rate should be used for each sequential download of a unit of video data based on a bandwidth estimate calculated over one or more recently downloaded units of video data.

Further, in one embodiment, the playback application 236 may allow users to accelerate a rate at which content stored in the content buffer 112 is played back. For example, a user may wish to accelerate the playback of a particular segment of a movie to move quickly through certain scenes. As described in greater detail herein, in such a case, the playback application 236 may accelerate the playback rate for the video and audio data, as well as request subsequent units of video data encoded to a lower bit rate to avoid a buffer under-run during the accelerated playback. Once the user returns to a normal playback rate, the playback application 236 may begin requesting video data at higher bit rates. In one embodiment, the playback application 236 determines which bit rate should be used for accelerated playback based on a bandwidth estimate calculated over one or more recently downloaded units of video data.

Figure 3:
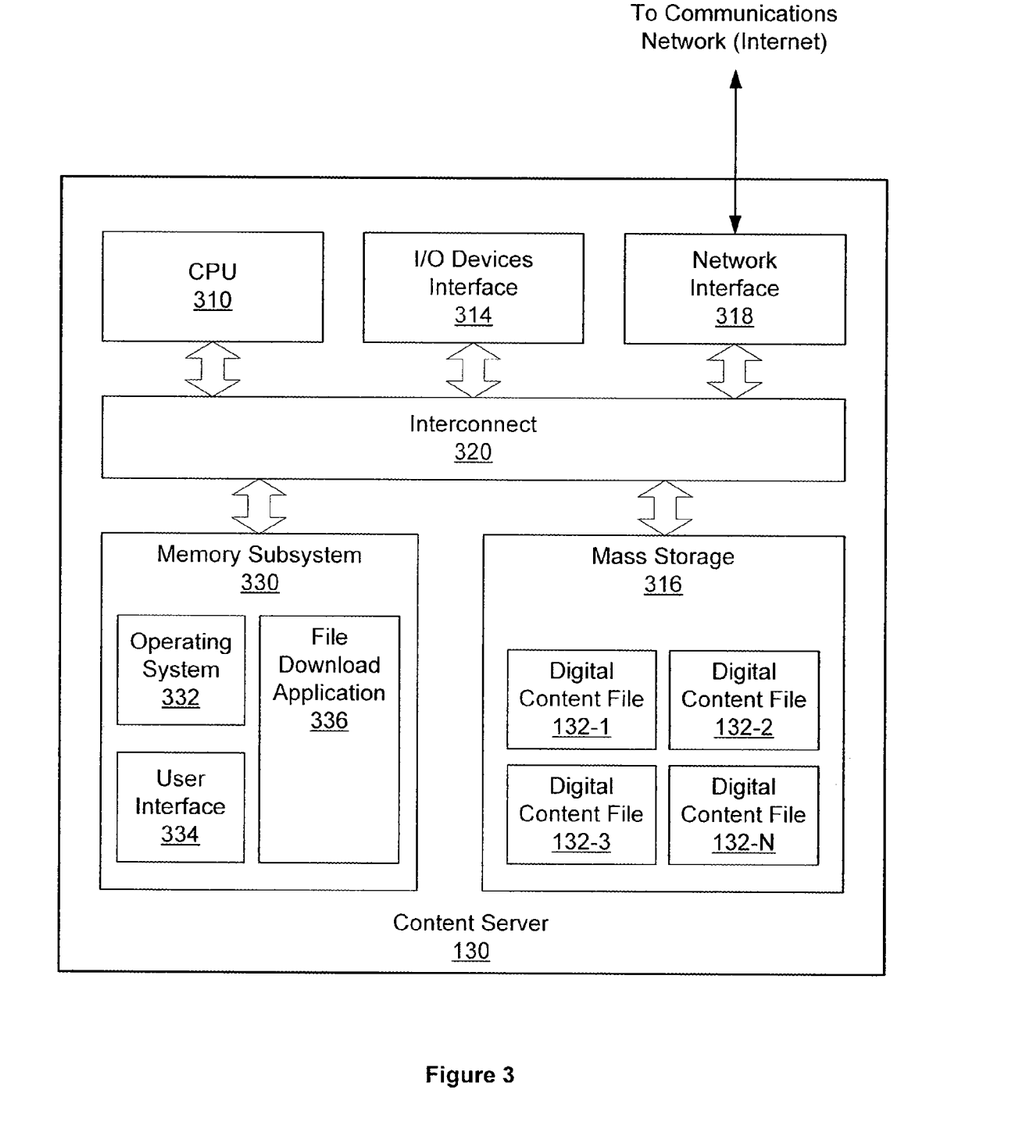
FIG. 3 further illustrates the content server of FIG. 1, according to one embodiment of the invention.

FIG. 3 is a more detailed view of the content server 130 of FIG. 1, according to one embodiment of the invention. The content server 130 includes, without limitation, a central processing unit (CPU) 310, a network interface 318, an interconnect 320, a memory subsystem 330, and a mass storage unit 316. The content server 130 may also include an I/O devices interface 314.

The CPU 310 is configured to retrieve and execute programming instructions stored in the memory subsystem 330. Similarly, the CPU 310 is configured to store and retrieve application data residing in the memory subsystem 330. The interconnect 320 is configured to facilitate transmission of data, such as programming instructions and application data, between the CPU 310, I/O devices interface 314, mass storage unit 316, network interface 318, and memory subsystem 330.

The mass storage unit 316 stores digital content files 132-1 through 132-N. The digital content files 132 may be stored using any technically feasible file system on any technically feasible media. For example the mass storage unit 316 may comprise a redundant array of independent disks (RAID) system incorporating a conventional file system.

The memory subsystem 330 includes programming instructions and data that comprise an operating system 332, a user interface 334, and a file download application 336. The operating system 332 performs system management functions such as managing hardware devices including the network interface 318, mass storage unit 316, and I/O devices interface 314. The operating system 332 also provides process and memory management models for the user interface 334 and the file download application 336. The user interface 334 provides a specific structure, such as a window and an object metaphor or a command line interface, for user interaction with content server 130. A user may employ the user interface 334 to manage functions of the content server. In one embodiment, the user interface 334 presents a management web page for managing operation of the content server 130. Persons skilled in the art will recognize the various operating systems and user interfaces that are well-known in the art and suitable for incorporation into the content player 130.

The file download application 336 is configured to facilitate transfer of digital content files 132-1 to 132-N, to the content player 110, via a file download operation or set of operations. The downloaded digital content file 132 is transmitted through network interface 318 to the content player 110 via the communications network 150. In one embodiment, file contents of each digital content file 132 may be accessed in an arbitrary sequence (known in the art as "random access"). As previously described herein, each digital content file 132 includes a sequence header index 114 and an encoded sequence. An encoded sequence comprises a full version of a given movie or song encoded to a particular bit rate, and video data associated with the encoded sequence is divided into units of video data. Each unit of video data corresponds to a specific span of playback time and begins with a frame including a sequence header specifying the size and the resolution of the video data stored in the unit of video data.

Figure 4A:
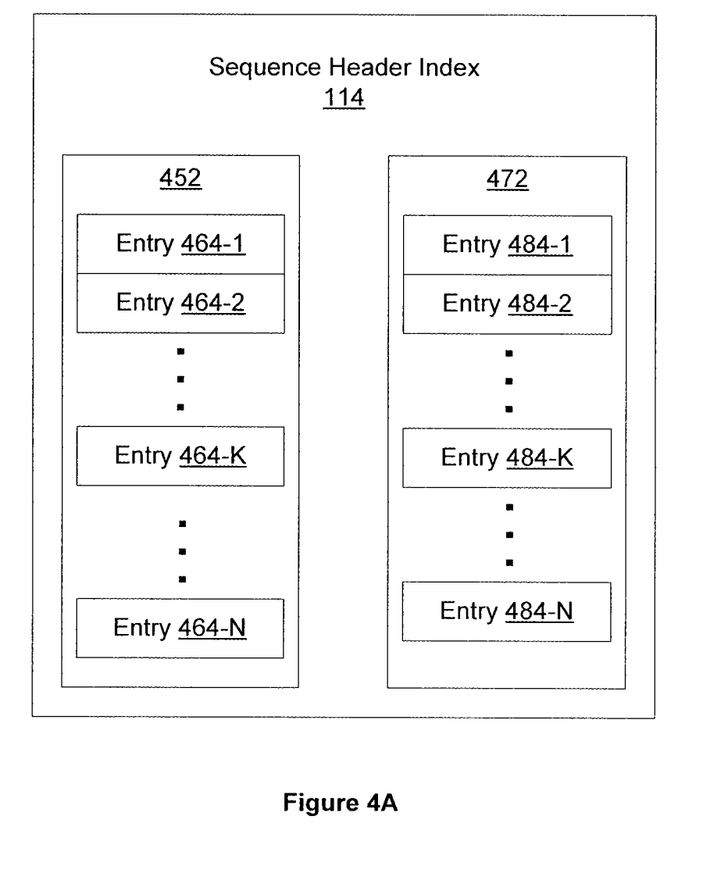
FIG. 4A further illustrates the sequence header index of FIG. 1, according to one embodiment of the invention.

FIG. 4A further illustrates the sequence header index 114 of FIG. 1, according one embodiment of the invention. The sequence header index 114 is a data structure that includes a video bit rate profile 452 and can be populated in any technically feasible fashion.

The sequence header index 114 included in the digital content file 132 specifies information related to the encoded sequence also included in the digital content file 132. The video bit rate profile 452 includes a corresponding set of entries 464 that specifies the locations and the timestamp offsets of the different sequence headers associated with the units of video data of the encoded sequence. Typically, the sequence headers in the encoded sequence are located at predictable timestamp offsets within the encoded sequence (e.g., every 3 seconds). A given entry 464 indicates a timestamp offset and the location of a specific sequence header included in a unit of video data of the encoded sequence associated with video bit rate profile 452. For example, entry 464-1 indicates the timestamp offset and the location of the sequence header associated with a first unit of video data of the encoded sequence. Entry 464-2 indicates the timestamp offset and the location of the sequence header associated with a second unit of video data of the same encoded sequence. Importantly, a total byte count characterizing how many bytes comprise a given encoded sequence from a current playback position, associated with entry 464-K, through completion of playback may be computed based on the timestamp offsets included in the set of entries 464.

The audio data associated with the enhanced sequence is also stored in the digital content file 132. In one embodiment, the audio data has a fixed bit rate encoding. In alternative embodiments a variable bit rate encoding technique is applied to audio data, and an audio bit rate profile 472 is included in the sequence header index 114. The audio bit rate profile 472 includes entries 484 configured to store a timestamp offset and a sequence header location for each respective unit of audio data at a respective time of playback.

Figure 4B:
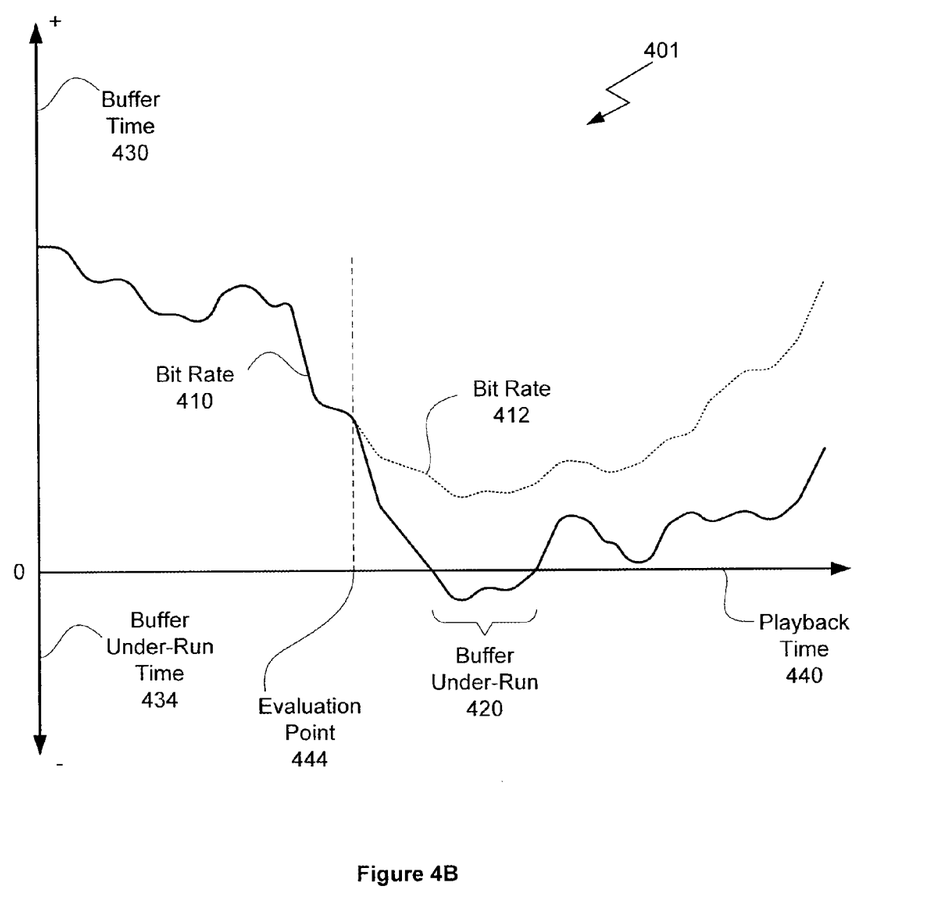
FIG. 4B is a graph illustrating the outcomes of a buffer prediction algorithms performed on two different bit rates at an evaluation point, according to one embodiment of the invention.

FIG. 4B is a graph 401 illustrating the outcomes of a buffer prediction algorithm performed for two different bit rates 410, 412 at an evaluation point 444, according to one embodiment of the invention. Buffer time 430, shown along a positive vertical axis, indicates how much effective playback time is stored within the content buffer 112 of FIG. 1. Buffer under-run time 434, shown along a negative vertical axis, indicates equivalent time deficit during a buffer under-run 420. Assume for this example that evaluation point 444 represents a point where the user requests accelerated playback (e.g., doubling the rate at which video data is played back). As shown, buffer time 430 estimates that a buffer under-run 420 will occur as a result of performing accelerated video playback using video data at bit rate 410, even with no changes in available bandwidth. In contrast, accelerated playback may be supported using bit rate 412 for prevailing bandwidth and latency conditions. Accordingly, in one embodiment, the playback application 236 begins requesting video data units at the bit rate 412 following the switch to accelerated playback that occurs at evaluation point 444.

Figure 4C:
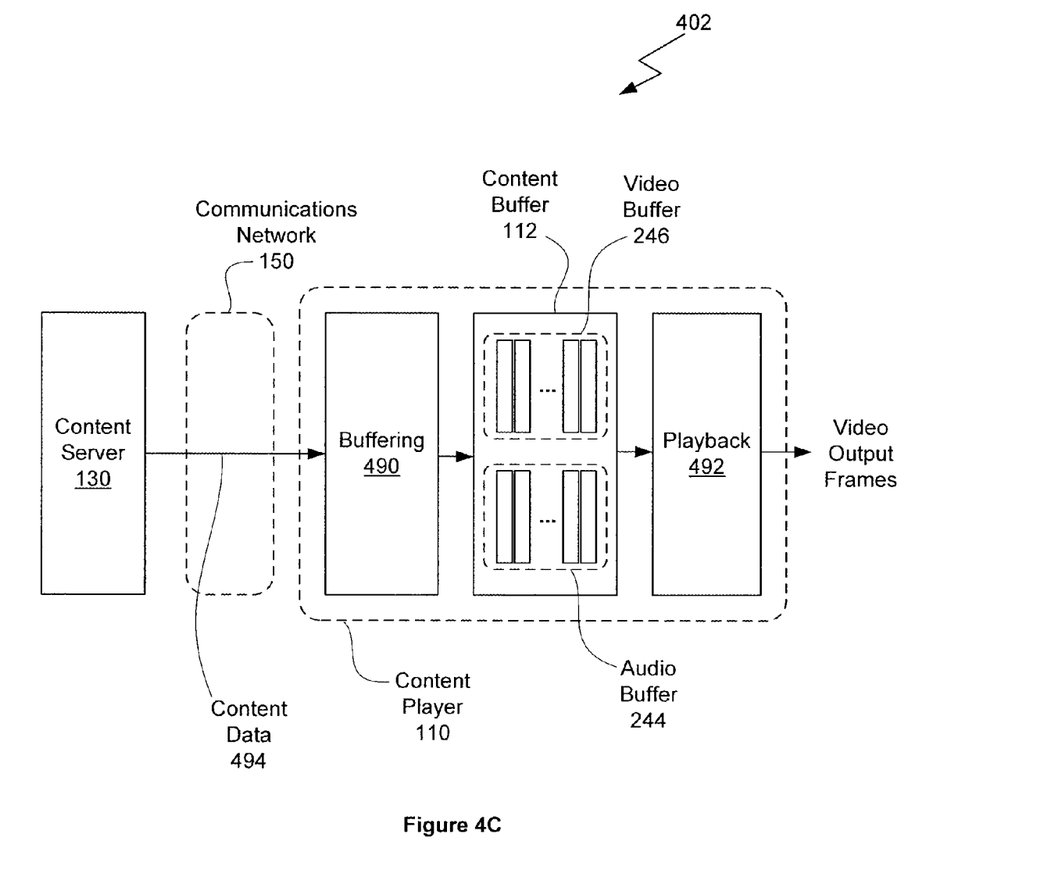
FIG. 4C illustrates data flow for buffering and playback of digital content associated with a digital content file, according to one embodiment of the invention.

FIG. 4C illustrates a data flow for buffering and playback of digital content 494 associated with a digital content file 132, according to one embodiment of the invention. The content server 130 of FIG. 1 provides content data 494, comprising units of audio data and units of video data, of the digital content file 132 to a buffering process 490. The buffering process 490 may be implemented as a thread executing within the content player 110. The buffering process 490 is configured to download the content data 494 and write the content data 494 to the content buffer 112. The buffering process 490 writes units of audio data to the audio buffer 244 within the content buffer 112, and units of video data to the video buffer 246, also within the content buffer 112. In one embodiment the content buffer 112 is structured as a first-in first-out (FIFO) queue. A playback process 492, also executing within the content player 110, de-queues units of audio data and units of video data from the content buffer 112 for playback. In order to maintain uninterrupted playback of content data 494, the content buffer 112 should always have at least one unit of audio data and one unit of video data available when the playback process 492 needs to perform a read on the content buffer 112. A buffer under-run occurs, as shown in FIG. 4B, when the content buffer 112 is empty and the playback process 492 needs to perform a read.

Figure 5:
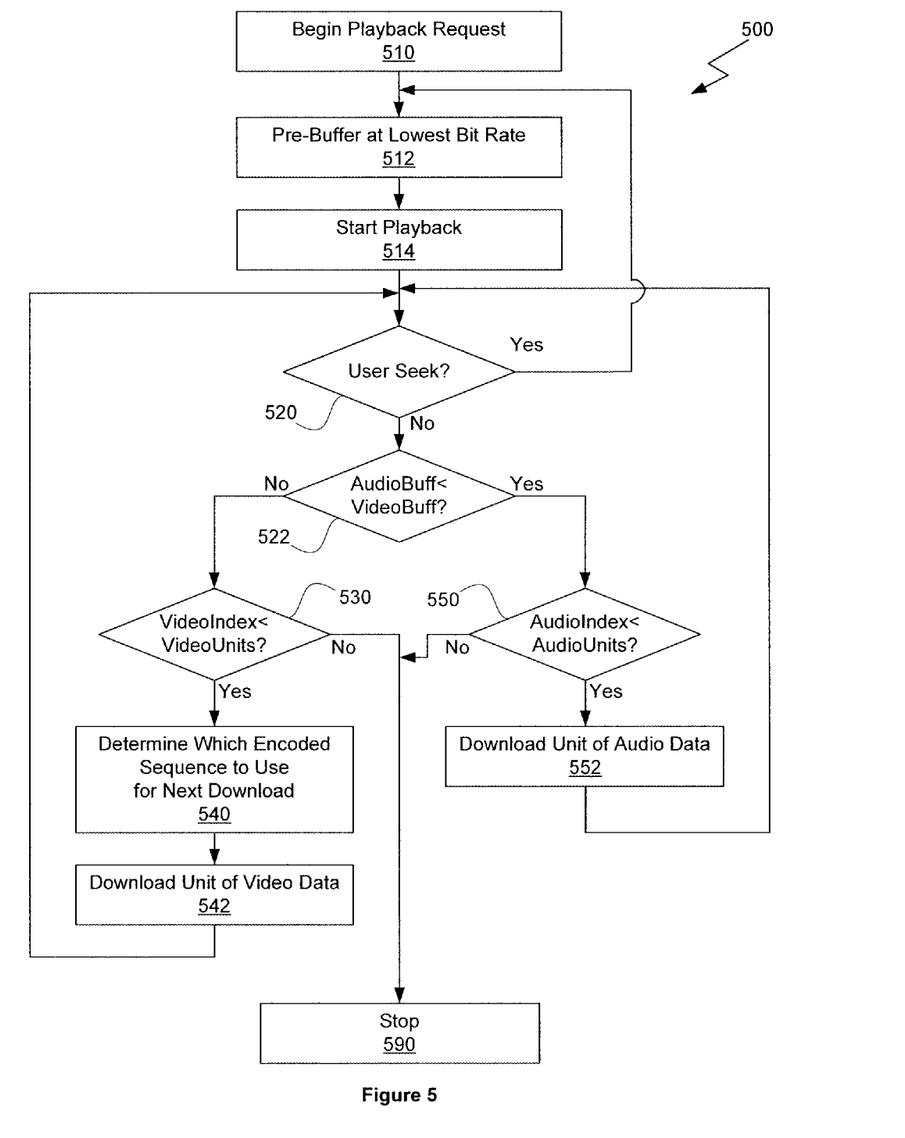
FIG. 5 illustrates a method for adaptively buffering content data into a content buffer for playback at a normal playback rate, according to one embodiment of the invention.

FIG. 5 illustrates a method 500 for adaptively buffering content data into a content buffer 112 for playback at a normal playback rate, according to one embodiment of the invention. Although the method steps are described in conjunction with the systems of FIGS. 1, 2, and 3, persons skilled in the art will understand that any system configured to perform the method steps, in any order, is within the scope of the invention.

As shown, the method 500 begins at step 510, where the playback application 236 of FIG. 2 receives a request to begin playback of the digital content file 132. In step 512, the playback application 236 pre-buffers one or more units of video data of the digital content file 132 at a lowest available bit rate into the content buffer 112 of FIG. 1. The playback application 236 also pre-buffers one or more corresponding units of audio data into the content buffer 112. At step 514, the playback application 236 starts playback at the normal playback rate (e.g., a playback rate of 1.0). From this point forward, a playback thread executes to render and display data from the content buffer 112 while the method steps 500 are performed to buffer new data into the content buffer 112. In one embodiment, the playback thread executes as part of playback application 236.

At step 520, the playback application 236 determines whether a user seek request has been received. If, in step 520, a user seek request has been received then the method returns to step 512 for pre-buffering. If, however, in step 520, a user seek request has not been received, then the method proceeds to step 522. In step 522, the playback application 236 determines whether the playback time remaining in the audio buffer 244 (AudioBuff) is less than the playback time remaining in video buffer 246 (VideoBuff). When the playback time remaining in the audio buffer 244 is greater than or equal to the playback time remaining in the video buffer 246, then more units of video data are needed for playback by the playback application 236. When the playback time remaining in the audio buffer 244 is less than the playback time remaining in the video buffer 246, then more units of audio data are needed for playback by the playback application 236. In such a fashion, the playback application 236 balances the download of units of video data and units of audio data of the digital content file 132.

At step 522, if the playback time remaining in the audio buffer 244 is greater than or equal to the playback time remaining in the video buffer 246, then at step 530, the playback application 236 determines whether a video index, corresponding to a sequential time slot for the currently playing unit of video data, is less than the total number of units of video data for the digital content file 132 currently being played. The total number of units of video data for the digital content file 132 may be retrieved from the sequence header index 114 associated with the digital content file 132.

At step 530, if the video index is less than the total number of units of video data for the digital content file 132, i.e., not all of the units of video data for the digital content file 132 have been played, then at step 540, the playback application 236 determines a next encoded sequence from which to buffer subsequent units of video data, based on buffer under-run predictions. The next encoded sequence may be a higher bit rate encoded sequence, a lower bit rate encoded sequence, or the same encoded sequence as the current encoded sequence. At step 542, the playback application 236 downloads a unit of video data, based on the determined next encoded sequence, and buffers the unit of video data in video buffer 246 within content buffer 112.

Returning to step 530, if the playback application 236 determines that the video index is not less than a total number of units of video data for the digital content file 132 currently being played, then no more units of video data are needed by the playback application 236 and the method terminates at step 590.

Returning to step 522, if the playback application 236 determines that the time remaining in the audio buffer 244 is less than the time remaining in video buffer 246, then more units of audio data are needed for playback by the playback application 236 and the method proceeds to step 550. In step 550, the playback application 236 determines whether an audio index, corresponding to a sequential time slot for the currently playing unit of audio data, is less than the total number of units of audio data for the digital content file 132 currently being played.

At step 550, if the playback application 236 determines that the audio index is less than a total number of units of audio data for the digital content file 132 currently being played, then another unit of audio data is needed by the playback application 236 and the method proceeds to step 552. At step 552, playback application 236 downloads a unit of audio data and buffers the unit of audio data in audio buffer 244 within content buffer 112.

However, if the playback application 236 determines that the audio index is not less than a total number of units of audio data for the digital content file 132 currently being played (step 550), then no more units of audio data are needed by the playback application 236 and the method terminates in step 590.

Figure 6:
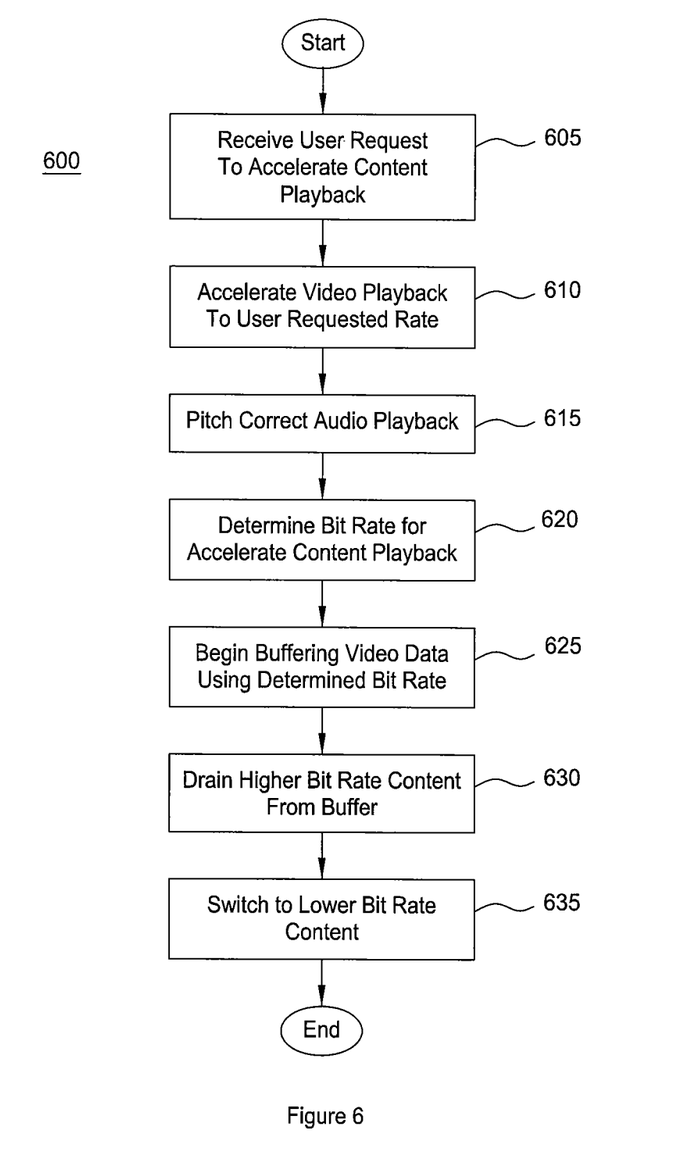
FIG. 6 illustrates a method for dynamically adjusting streaming media bit rates in response a user request for accelerated playback, according to one embodiment of the invention.

FIG. 6 illustrates a method 600 for dynamically adjusting streaming media bit rates in response a user request for accelerated playback, according to one embodiment of the invention. Although the method steps are described in conjunction with the systems of FIGS. 1, 2, and 3, persons skilled in the art will recognize that any system configured to perform the method steps, in any order, is within the scope of the invention.

As shown, the method 600 begins at step 605, where the playback application 236 receives a user request to accelerate content playback. For example, a graphical user interface presented on a computing system, a remote control device, or physical controls on a set-top box may include a button (or other control) used to initiate an accelerated playback mode when presenting streaming media. In one embodiment, the controls may allow the user to switch to a fixed accelerated playback rate (e.g., to a rate of 1.5× or 2.0×). Alternatively, the device may allow the user to increase (and decrease) the accelerated playback using a fixed increment as desired (e.g., from a rate of 1.0 to a rate of 1.1× to 1.2×, etc.).

At step 610, the playback application 236 may accelerate video and/or audio playback to the accelerated rate requested by the user. That is, the playback application 236 begins decoding content in the content buffer 112 and rendering the decoded audiovisual content back at the accelerated rate specified in step 605 on an playback device (e.g., a display screen and audio speakers) Additionally, in one embodiment, the playback application may pitch correct the audio playback to compensate for the accelerated playback rate (step 615). Doing so avoids an increase in pitch in the audio playback that would otherwise occur as a result of the accelerated playback rate. As is known, pitch correction generally refers to a process of correcting the intonation of an audio signal without affecting other aspects of its sound.

Figure 7:
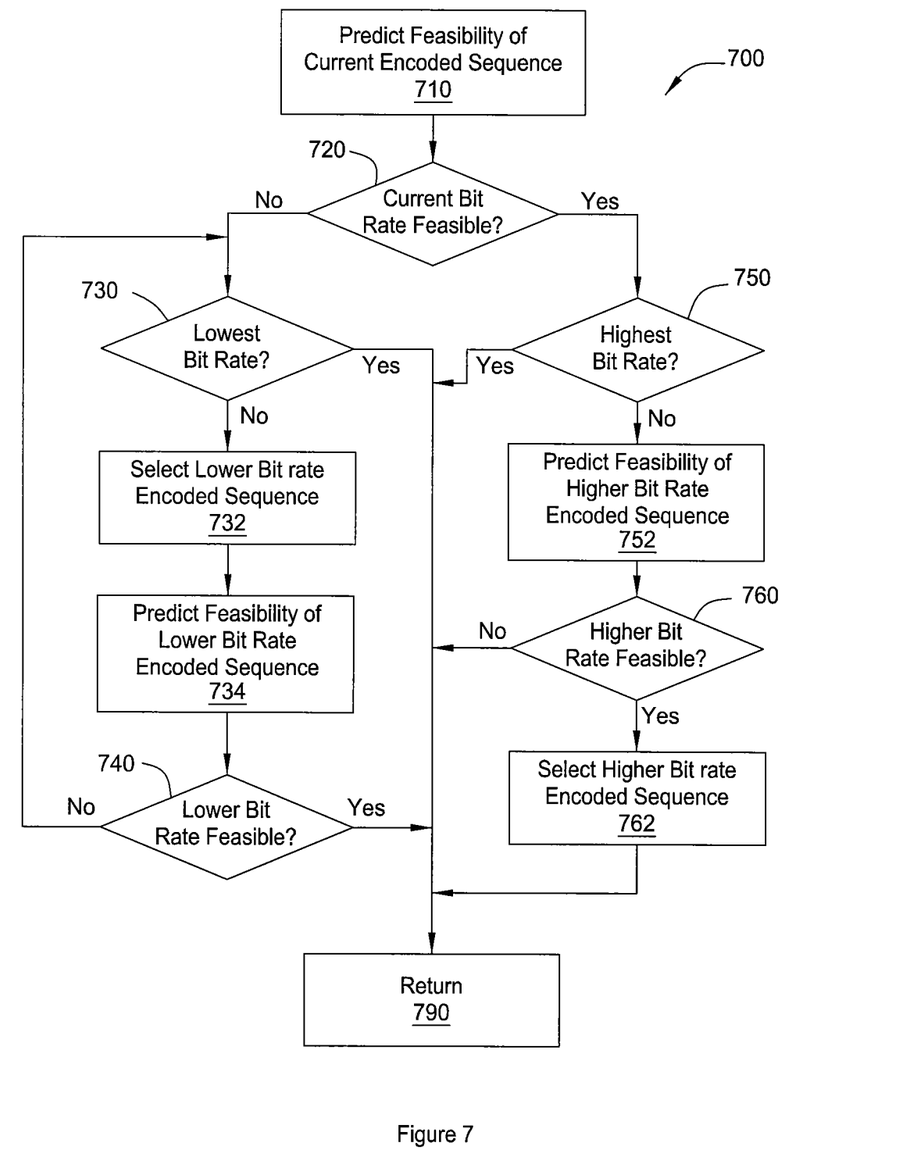
FIG. 7 illustrates a method for selecting a bit rate to use in a request for a next encoded sequence to be buffered for streaming playback, according to one embodiment of the invention.

At step 620, the playback application 236 may determine a bit rate for accelerated content playback that can be supported without resulting in a buffer under-run. FIG. 7, described below, illustrates a method for determining a feasible bit rate for accelerated content playback. At step 625, the playback application 236 begins buffering video data using the bit rate determined at step 620. Although the playback application 236 begins buffering video data at the lower bit rate, the content buffer 112 may contain some amount of data already received at a higher bit rate. Accordingly, at step 630, the playback application 236 drains this content from the content buffer. That is, video content buffered prior to the switch to the accelerated playback mode is used for playback. At step 635, once any available higher bit rate content is drained, the playback application 236 begins playing buffered content having the bit rate determined at step 620.

The playback application 236 may continue to request content at the bit rate determined at step 620 for as long as the user leaves the playback application in the accelerated playback mode. However, should prevailing bandwidth conditions change, the playback application 236 may respond by adjusting the bit rate used during the accelerated playback mode. Further, should the user select to discontinue the accelerated playback mode, the playback application 236 may again determine the then best feasible bit rate for playing back video content at the normal playback rate.

FIG. 7 illustrates a method 700 for determining a next encoded sequence to be buffered for playback, according to one embodiment of the invention. Although the method steps are described in conjunction with the systems of FIGS. 1, 2, and 3, persons skilled in the art will understand that any system configured to perform the method steps, in any order, is within the scope of the invention. The method 700 describes aspects of step 540 of FIG. 5 and step 620 of FIG. 6 in greater detail. That is, method 700 may be used to determine what bit rates should be present in encoded sequences (video data units) requested by the playback application 236 in response to transient changes in available bandwidth (step 540 of FIG. 5) as well in response to a user selecting to enter an accelerated playback mode (step 620 of FIG. 6).

As shown, method 700 begins at step 710, where the playback application 236 predicts a feasibility of playing a current encoded sequence to completion without a buffer under-run. Persons skilled in the art will recognize that a feasibility determination may be implemented using a variety of techniques. If, at step 700, the playback application 236 determines that the current encoded sequence corresponding to a current bit rate is not feasible, then the method 700 proceeds to step 730. If, in step 730, the playback application 236 is currently playing an encoded sequence that does not represent a lowest bit rate encoded sequence, then the method proceeds to step 732, where the playback application 236 selects an encoded sequence corresponding to a lower bit rate than the current bit rate as a candidate encoded sequence. At step 734, the playback application 236 predicts a feasibility of playing the candidate encoded sequence. If at step 740, the playback application 236 determines that the candidate encoded sequence is feasible, then the method terminates in step 790, where the candidate encoded sequence is returned as the next encoded sequence.

Returning to step 730, if the playback application 236 is currently playing an encoded sequence that represents an encoded sequence corresponding to the lowest bit rate then the method terminates at step 790 with the current (lowest) encoded sequence returned as the next encoded sequence.

Returning to step 720, if the playback application 236 determines that the current encoded sequence is feasible, then the method 700 proceeds to step 750. If, at step 750, the playback application 236 is currently playing an encoded sequence that does not represent a highest bit rate encoded sequence, then the method proceeds to step 752. In step 752, the playback application 236 predicts the feasibility of an encoded sequence corresponding to a higher bit rate than the current bit rate.

At step 760, the playback application 236 determines the encoded sequence corresponding to the higher bit rate to be feasible, then the method proceeds to step 762. In step 762, the playback application 236 selects a higher bit rate encoded sequence to be returned as the next encoded sequence. If, however, at step 760, the playback application 236 determines that the encoded sequence corresponding to the higher bit rate is not feasible, then the method 700 terminates in step 790 with the current encoded sequence returned as the next encoded sequence.

Returning to step 750, if the playback application 236 is currently playing an encoded sequence that represents an encoded sequence corresponding to the highest bit rate, then the method terminates at step 790 with the current (highest) encoded sequence returned as the next encoded sequence.

Figure 8:
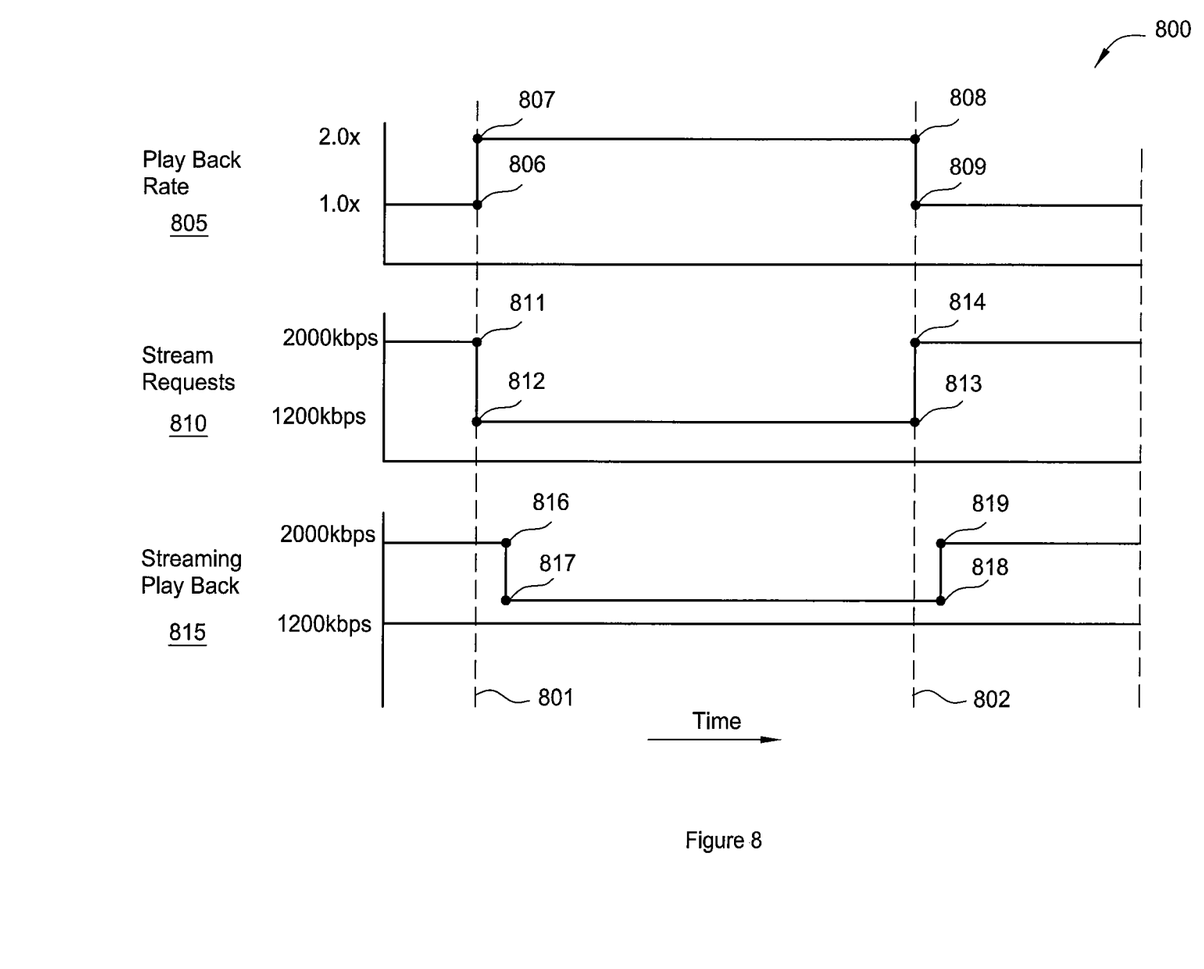
FIG. 8 is a time sequence diagram illustrating an example of a user dynamically selecting accelerated playback rates for streaming media, according to one embodiment of the invention.

FIG. 8 is a time sequence diagram 800 illustrating an example of a user dynamically selecting accelerated playback rates for streaming media, according to one embodiment of the invention. The time sequence diagram 800 shows the relationships between playback rates, requests for encoded video, and bit rates used for streaming video playback when a user requests accelerated video playback. As shown, the diagram 800 includes a playback rate 805, a bit rate specified in streaming requests 810, and a bit rate used for streaming playback 810.

In the example of FIG. 8, assume that a user switches the playback of streaming media from a normal playback rate of 1.0 to an accelerated bit of rate of 2.0 at a first point 801 in time and returns playback to the normal playback rate at a second point 802 in time. Accordingly, the playback rate 805 jumps from a normal playback rate of 1.0 at point 806 to a doubled playback rate of 2.0 at point 807. Playback then continues at the accelerated rate until the user discontinues accelerated playback (point 808). In response, playback rate 805 returns to a normal playback rate of 1.0 (point 809). Playback then continues at the normal 1.0 rate.

As described above, when the user enters an accelerated playback mode, the playback application 236 determines a new feasible bit rate to use in requests for encoded sequences (i.e., for video data units). Typically, switching to an accelerated playback rate results in a reduced bit rate for units of video data requested from the content server. As shown in the example of FIG. 8, stream requests 810 fall from a rate if 2000 kbps at point 811 to a rate of 1200 kbps at point 812. In one embodiment, the bit rate selected for data requested while operating in an accelerated playback mode may be determined according to the method 700 shown in FIG. 7. Thus, a bit rate may be selected to maximize video quality while avoiding buffer under-runs, based on the accelerated playback rate selected by the user and the available network bandwidth.

Streaming playback 815 shows the bit rate of content used for streaming video playback following the switch to the accelerated playback rate. As shown, playback continues using video data encoded at a 2000 kbps rate following the switch (at point 801) from playback at the normal rate of 1.0 to the accelerated rate of 2.0. This occurs as data content encoded at the higher bit rate remains available in the content buffer 112. Such content is used for playback at the accelerated rate until a switch point is reached (point 816). Following the switch point, playback continues using video data units encoded at the lower rate of 1200 kbps. Note, in this example, the playback application 236 began requesting video data units at the 1200 kbps rate beginning at point 812 in the stream requests 810.

Similarly, when the user discontinues accelerated playback at point 802, streaming playback 815 continues using content encoded at the lower bit rate of 1200 kbps. However, playback application 236 began requesting content encoded at a higher bit rate at point 814. Thus, once the content encoded at the lower bit rate of 1200 kbps is drained from the content buffer 112, the playback jumps back to the higher quality bit rate (points 818 and 819).

In sum, a technique is disclosed for dynamically adjusting streaming media bit rates in response to user requests for accelerated playback. Users may interact with a content layer to select an accelerated playback for streaming media content (e.g., to increase playback from a normal rate of 1.0 to an accelerated rate of 1.5× or 2.0×). In response, a content player begins decoding data from a content buffer at the accelerated rate. In one embodiment, a content player estimates a bit rate that can be supported by both the accelerated playback rate and prevailing network bandwidth and latency. That is, a bit rate at which the accelerated playback may be continued without resulting in an eventual buffer under-run. Further, the content player may pitch correct an audio stream to compensate for the accelerated playback rate. Thus, advantageously, users may move quickly through selected portions of streaming video content while still following the events depicted in a streaming audiovisual presentation.

Further still, although described herein in terms of a typical example where a user requests an accelerated playback rate, resulting in a decrease in the bit rate used to encode video data units streamed to the content player, one of ordinary skill in the art will recognize that the processes described herein may be adapted to provide a content player where a user requests to decelerate the playback rate. For example, a user may desire to slow down a particular sequence of streaming media, and in response, the content player may be able to increase the bit rate to a higher quality for periods of decelerated playback. This may allow, e.g., a user to effectively view a selected portion of video data in slow motion using a higher quality bit rate.

One embodiment of the invention may be implemented as a program product stored on computer-readable storage media within the content player 110. In this embodiment, the content player 110 may be embedded within a computing device such as a set top box. An alternative embodiment may be implemented as a program product that is downloaded to a memory within a computer system, for example as executable instructions embedded within an internet web site. In this embodiment, the content player 110 comprises the computer system.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A method for dynamically adjusting a bit rate used to encode units of digital content downloaded from a content server to a content player, the method comprising:
   receiving a user request to modify a playback speed at which the units of digital content are played back on the content player from a first playback speed to a second playback speed, wherein the second playback speed is faster than the first playback speed, and wherein the units of digital content are stored in a buffer on the content player prior to playback;
   decoding the units of digital content stored in the buffer at a first bit rate;
   rendering a display of the decoded units of digital content on an output display device at the second playback speed; and
   upon receiving the user request to modify the playback speed, and prior to downloading a next unit of digital content from the content server:
      determining that a buffer underrun event will occur if the next unit of digital content is downloaded from the content server at the first bit rate and playback at the second playback speed begins, based on a measure of currently available network bandwidth for data communications between the content server and the content player;
      determining a second bit rate at which to download the next unit of digital content, based on the second playback rate and the measure of currently available network bandwidth; and
      downloading the next unit of digital content from the content server to the buffer for playback at the second bit rate, wherein the second bit rate is lower than the first bit rate.

2. The method of claim 1, wherein the next unit of digital content downloaded into the buffer for playback is decoded and rendered on the output display device at the second playback rate.

3. The method of claim 1, wherein the digital content encodes an audio stream and a video stream.

4. The method of claim 3, further comprising, pitch correcting the audio stream to compensate for the second playback rate.

5. The method of claim 1, further comprising:
   receiving a request to modify the playback rate from the second playback rate to the first playback rate;
   rendering a display of the units of digital content on the output display device at the first playback rate;
   determining a bit rate for a next unit of digital content to be requested from the content server, based on the first playback rate and on an available network bandwidth for data communications between the content server and the content player.

6. A non-transitory computer-readable medium including instructions that, when executed by a processing unit, cause the processing unit to dynamically adjust a bit rate used to encode units of digital content downloaded from a content server to a content player, by performing the steps of:
   receiving a user request to modify a playback speed at which the units of digital content are played back on the content player from a first playback speed to a second playback speed, wherein the second playback speed is faster than the first playback speed, and wherein the units of digital content are stored in a buffer on the content player prior to playback;
   decoding the units of digital content stored in the buffer at a first bit rate;
   rendering a display of the decoded units of digital content on an output display device at the second playback speed; and
   upon receiving the user request to modify the playback speed, and prior to downloading a next unit of digital content from the content server:
      determining that a buffer underrun event will occur if the next unit of digital content is downloaded from the content server at the first bit rate and playback at the second playback speed begins, based on a measure of currently available network bandwidth for data communications between the content server and the content player;
      determining a second bit rate at which to download the next unit of digital content, based on the second playback rate and the measure of currently available network bandwidth; and
      downloading the next unit of digital content from the content server to the buffer for playback at the second bit rate, wherein the second bit rate is lower than the first bit rate.

7. The non-transitory computer-readable medium of claim 6, wherein the next unit of digital content downloaded into the buffer for playback is decoded and rendered on the output display device at the second playback rate.

8. The non-transitory computer-readable medium of claim 6, wherein the digital content encodes an audio stream and a video stream.

9. The non-transitory computer-readable medium of claim 8, wherein the steps further comprise, pitch correcting the audio stream to compensate for the second playback rate.

10. The non-transitory computer-readable medium of claim 6, wherein the steps further comprise:
    receiving a request to modify the playback rate from the second playback rate to the first playback rate;
    rendering a display of the units of digital content on the output display device at the first playback rate;
    determining a bit rate for a next unit of digital content to be requested from the content server, based on the first playback rate and on an available network bandwidth for data communications between the content server and the content player.

11. A content player device configured to adjust a bit rate used to encode units of digital content downloaded from a content server to a content player, the content player device comprising:
    a memory that includes a content buffer for storing downloaded digital content; and
    a processing unit coupled to the memory and configured to:
       receive a user request to modify a playback speed at which the units of digital content are played back on the content player from a first playback speed to a second playback speed, wherein the second playback speed is faster than the first playback speed, and wherein the units of digital content are stored in the buffer prior to playback,
       decode the units of digital content stored in the buffer at a first bit rate,
       render a display of the decoded units of digital content on an output display device at the second playback speed; and
       upon receiving the user request to modify the playback speed, and prior to downloading a next unit of digital content from the content server:

determine that a buffer underrun event will occur if the next unit of digital content is downloaded from the content server at the first bit rate and playback at the second playback speed begins, based on a measure of currently available network bandwidth for data communications between the content server and the content player;

determine a second bit rate at which to download the next unit of digital content, based on the second playback rate and the measure of currently available network bandwidth; and download the next unit of digital content from the content server to the buffer for playback, at the second bit rate, wherein the second bit rate is lower than the first bit rate.

12. The content player device of claim 11, wherein the next unit of digital content downloaded into the buffer for playback is decoded and rendered on the output display device at the second playback rate.

13. The content player device of claim 11, wherein the digital content encodes an audio stream and a video stream.

14. The content player device of claim 13, wherein the processing unit is further configured to pitch correct the audio stream to compensate for the second playback rate.

15. The content player device of claim 11, wherein the processing unit is further configured to:

receive a request to modify the playback rate from the second playback rate to the first playback rate;

render a display of the units of digital content on the output display device at the first playback rate;

determine a bit rate for a next unit of digital content to be requested from the content server, based on the first playback rate and on an available network bandwidth for data communications between the content server and the content player.

* * * * *